Figure 1:
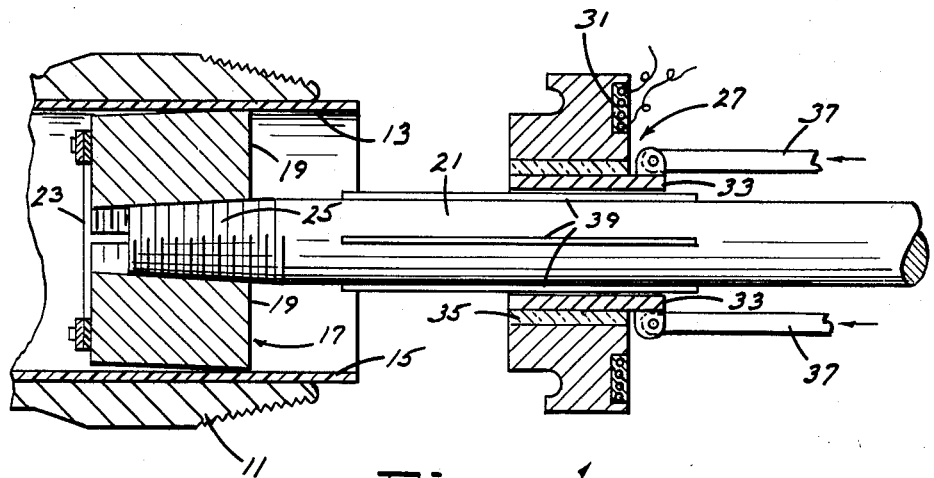

May 31, 1966   A. S. AHMAD   3,253,841
LINED CONDUIT JOINT
Filed Dec. 5, 1963

United States Patent Office 3,253,841
Patented May 31, 1966

3,253,841
LINED CONDUIT JOINT
Alan S. Ahmad, Dallas, Tex., assignor to Avisun Corporation, Philadelphia, Pa., a corporation of Delaware
Filed Dec. 5, 1963, Ser. No. 328,250
1 Claim. (Cl. 285—55)

The present invention relates to a sealed joint for lined conduits.

A conventional and perhaps the most common method for rendering metallic conduits or pipes more resistant to corrosion involves spraying the internal surface thereof with a suitable material, such as an epoxy, phenolic, polyester or polyurethane plastic material. By exercising care during the spraying operation, the plastic material can be applied so as to provide for a continuous and unbroken coating along the internal surface of a conduit or pipe. However, it is difficult with this known method to determine whether the applied coating is continuous, unbroken and of uniform thickness. More important, such applied coatings are easily chipped at the ends of the conduits during ordinary handling. As a result, the exposed portions of the internal surface of such conduit are subjected to the corrosive effects of the fluids which are being conveyed through the conduit, and further, often facilitate the spreading of such corrosive fluids in-between the conduit and the applied coating. Accordingly, a primary object is to provide a generally new or improved and more satisfactory joint for lined conduits.

Another object of this invention is the provision of an improved lined metallic conduit which provides for positive corrosion protection at the ends thereof and which can be repeatedly re-used.

Still another object is the provision of an improved joint for lined conduits in which metals of different composition are prevented from contacting each other or being exposed to the fluid which is to be conveyed therethrough.

These objects are accomplished in accordance with the present invention by covering the internal surface of a metallic conduit or pipe with a preformed, continuous, non-metallic liner. Preferably the liner is formed of polypropylene in view of its chemically inert characteristics, and more important, its ability to be flared without rupturing during its application to such conduit or pipe.

Preformed liners are employed and are of such length as to project from the opposite ends of the respective conduits. Once inserted, the liner is locked against movement relative to the conduit after which its projecting ends are softened, as by heat, and then flared upwardly and over the respective ends of the conduit. The applied liner completely shields the entire internal surface and ends of the conduit and is preferably feathered at its ends so as to permit a coupling to be easily applied thereover.

The joint for the lined conduits includes a coupling which threadedly connects the adjacent ends of the lined conduits and a seal assembly against which the ends of the lined conduits abut as the coupling is threaded into position. The seal assembly includes a pair of rigid sleeves, which engage and maintain the ends of the conduit liners snugly engaged with the ends of the respective conduits, and an inwardly projecting insert or ring which is interposed between the rigid sleeves and provides for a fluid-tight joint. The rigid sleeves are preferably formed of Monel or other materials which are resistant to the particular fluid which is to be conveyed through the lined conduits. While the insert may be formed of polypropylene or polytetrafluoroethylene resin "Teflon" or other chemically inert but flexible material. If desired the rigid sleeves may be eliminated without departing from the spirit or scope of the present invention.

Figure 2:
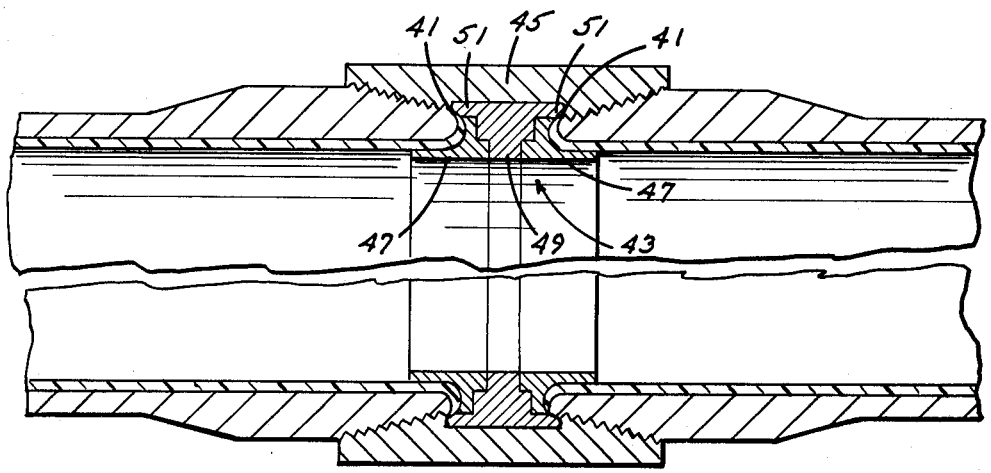
Figure 3:
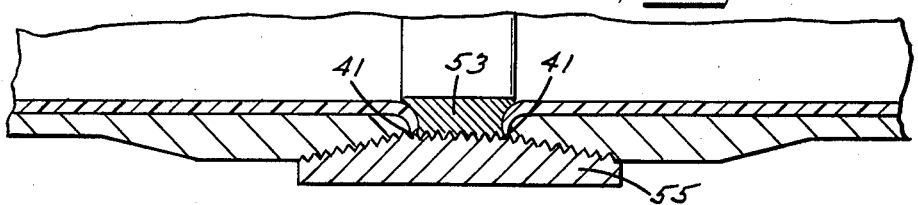

In the drawing:
FIGURE 1 is a sectional view taken longitudinally of a portion of a conduit in which a liner is about to be fixed;
FIGURE 2 is a sectional view taken longitudinally through a joint formed in accordance with the present invention; and
FIGURE 3 is a view similar to FIGURE 2 illustrating a modified joint arrangement.

With reference to the drawing, FIGURE 1 illustrates the end portion of a conduit or pipe 11 which is to be lined with a preformed, continuous and unbroken polypropylene liner 13. The liner 13 is slightly smaller than the conduit 11 in diameter but is of greater length so as to project outwardly from the opposite ends thereof, as shown at 15.

At the start of the lining method, the liner 13 is locked against movement relative to the conduit 11 by an expandable mandrel or plug 17, which includes a pair of wedge sections 19 and threaded operating shaft 21. The wedge sections 19 are loosely interconnected by links 23 while the threaded shaft 21 is tapered at 25. Thus, as the shaft 21 is advanced further in-between the wedge sections 19 these sections are, of course, urged apart and thereby frictionally lock the liner 13 against the internal surface of the conduit 11.

Once the liner 13 is locked in place, a heated flaring tool 27 is moved along the shaft 21 and pressed against the projecting end of the liner 13. The flaring tool 27 includes a ring 29 which is heated by a resistance element 31, a bearing 33 which rides on the shaft 21, a sleeve 35 for insulating the bearing 33 from the heated ring 29 and links 37 for moving the tool 27 along the shaft 21. Keys 39 are provided on the shaft 21 to permit the flaring tool 27 to be translated without rotating relative thereto.

As heretofore mentioned, one of the particular advantages of making the liner 13 from polypropylene is because of its ability to be flared without cracking or rupturing. Thus, as the heated flaring tool 27 is urged against the liner 13 the projecting end thereof is softened and flared outwardly and over the adjacent end of the conduit 11. Of particular importance is that the free end of the liner 13 is formed with a feathered edge, as shown at 41, so that the liner 13 itself in no way interferes with the connection of such conduit to other lined conduits or pipe fixtures.

After both ends of the polypropylene liner have been flared as described above, a pair of such lined conduits may be connected in a manner as shown in either FIGURE 2 or 3. With the arrangement shown in FIGURE 2 a seal assembly, indicated generally at 43, is interposed between the ends of a pair of lined conduits 11 which are joined together by a threaded coupling 45. The seal assembly 43 includes a pair of sleeves 47 and an insert 49. The sleeves 47 are formed of Monel, or other metal which is resistant to the fluids which are to be conveyed through the conduits, and serve to maintain the flared ends of the liner 13 pressed snugly against the adjacent ends of the conduits 11. The insert 49, on the other hand, is preferably formed of a chemically inert organic polymeric material, such as polypropylene or polytetrafluoroethylene resin "Teflon" and provides for a fluid-tight joint between the sleeves 47. It will be noted that insert 47 is shaped with flange portions 51 which extend in-between the coupling 45 and the sleeves 47 so that metal-to-metal contact between these parts is prevented.

The joint arrangement shown in FIGURE 3 differs from that described above in that no sleeves are employed. In this modification, the adjacent ends of the lined conduits 13 abut against an insert 53, which is the same as the insert 49 described above, and are connected together by a threaded coupling 55. The insert 53 serves the dual function of maintaining the flared ends of the liner 13 engaged with the respective ends of the conduits 11 and to provide for a fluid-tight joint. The arrangement is thus better suited for less rugged duty than the conduit joint shown in FIGURE 3.

Of particular importance is that the continuous and unbroken liner of polypropylene is not readily chipped or cracked. Thus, the lined conduit can withstand rugged and repeated handling and use without risk of damaging the end portions of the liner and possible exposure of the inside surface of the conduit. Further, it will be noted that in both of the joint arrangements illustrated none of the internal surfaces of the conduits are exposed to the fluids to be conveyed therethrough. Additionally, the joint arrangements insure that no different metals contact with each other or are exposed to the fluid which is to be conveyed so that the possibility of electrolytic corrosion of the conduits or connecting members is completely avoided.

It is to be understood that changes and variations may be made without departing from the spirit and scope of the invention as defined in the appended claim.

I claim:

A joint including at least two metallic conduits disposed in end to end relationship, a preformed, unitary, non-metallic liner positioned within and extending beyond the ends of each of said conduits for protecting the same against the corrosive action of fluids which are to be conducted therethrough, said liners each being flared outwardly and over the ends of the respective conduits and provided with feathered edges, a sealing assembly interposed between and abutted by the adjacent ends of the lined conduits, said sealing assembly including a ring formed of non-metallic material which is interposed between and interlocked with a pair of corrosion resistant metal sleeves, said sleeves each having portions which extend into an adjacent lined conduit and being of substantially the same inside diameter as said ring, and a coupling threaded onto the ends of said lined conduit and enclosing said sealing assembly for maintaining said sealing assembly and conduits in substantially fixed relationship.

References Cited by the Examiner

UNITED STATES PATENTS

| 1,615,536 | 1/1927 | Del Mar | 285—371 |
| 2,086,151 | 7/1937 | Bannerman | 285—55 |
| 2,148,747 | 2/1939 | Hampe | 29—157 |
| 2,613,958 | 10/1952 | Richardson | 285—55 |
| 2,805,872 | 9/1957 | Routh | 285—55 |
| 3,047,937 | 8/1962 | De Vecchi | 29—157 |
| 3,142,499 | 7/1964 | Lang | 285—55 |
| 3,199,879 | 8/1965 | Fleming. | |

FOREIGN PATENTS

| 881,192 | 1/1943 | France. |
| 883,048 | 3/1943 | France. |
| 1,268,406 | 6/1961 | France. |
| 1,022,860 | 1/1958 | Germany. |

CARL W. TOMLIN, *Primary Examiner.*

R. A. GIANGIORGI, *Assistant Examiner.*